(12) United States Patent
Lee et al.

(10) Patent No.: US 8,160,645 B2
(45) Date of Patent: Apr. 17, 2012

(54) APPARATUS AND METHOD FOR SUPPORTING SIM CARD IN MOBILE COMMUNICATION TERMINAL HAVING MULTIPLE MODEMS

(75) Inventors: Joo-Hyun Lee, Paju-si (KR); Beom-Yong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/972,933

(22) Filed: Dec. 20, 2010

(65) Prior Publication Data
US 2011/0151930 A1    Jun. 23, 2011

(30) Foreign Application Priority Data
Dec. 21, 2009    (KR) .................. 10-2009-0127810

(51) Int. Cl.
*H04B 1/38* (2006.01)
(52) U.S. Cl. .................. 455/558; 455/552.1; 455/553.1
(58) Field of Classification Search .................. 455/558, 455/552.1, 553.1
See application file for complete search history.

(56) References Cited

U.S. PATENT DOCUMENTS
2009/0313497 A1* 12/2009 Lumbroso et al. .............. 714/3

FOREIGN PATENT DOCUMENTS
KR    2004103195 A  * 12/2004
KR    2006102674 A  *  9/2006
* cited by examiner

*Primary Examiner* — David Q Nguyen
(74) *Attorney, Agent, or Firm* — Jefferson IP Law, LLP

(57) ABSTRACT

An apparatus and method for supporting a Subscriber Identity Module (SIM) card in a mobile communication terminal including a plurality of modems are provided. The apparatus includes the SIM card for storing user information, and the plurality of modems each for providing a clock and for transmitting/receiving a signal by an independent interface with respect to the SIM card. Only a first modem of the plurality of modems controls a reset of the SIM card.

11 Claims, 4 Drawing Sheets

APPARATUS AND METHOD FOR SUPPORTING SIM CARD IN MOBILE COMMUNICATION TERMINAL HAVING MULTIPLE MODEMS

PRIORITY

This application claims the benefit under 35 U.S.C. §119 (a) of a Korean patent application filed in the Korean Intellectual Property Office on Dec. 21, 2009 and assigned Ser. No. 10-2009-0127810, the entire disclosure of which is hereby incorporated by reference.

BACKGROUND OF THE INVENTION

1. Field of the Invention

The present invention relates to a mobile communication terminal having a plurality of modems. More particularly, the present invention relates to a connection structure of the plurality of modems and a Subscriber Identity Module (SIM) card and a method and apparatus for performing an operation by using the connection structure.

2. Description of the Related Art

With the development of electrical and electronic technologies and a variety of communication techniques, mobile communication terminals supporting a plurality of communication systems by including a plurality of modems have recently been launched, and research for more effective operations of these mobile communication terminals is in progress. For example, there is ongoing research for providing control by effectively connecting a plurality of modems and a Subscriber Identity Module (SIM) card in the mobile communication terminals.

In general, the connection and operation between the modems and the SIM card require four interfaces (e.g., a Voltage (VCC) line for supplying power, an Input-Output (IO) line for transmitting/receiving a polling signal and data, a Clock (CLK) line for providing a clock, and a Reset (RST) line for resetting the SIM card). A mechanism for connecting the plurality of modems and the SIM card is under research to obtain high efficiency in terms of systems.

FIG. 1 and FIG. 2 illustrate a connection structure of a SIM card and a plurality of modems in a mobile communication terminal according to the related art.

Referring to FIG. 1, each of a modem A 100 and a modem B 110 may be connected to a SIM card 120 through four interfaces, or as illustrated in FIG. 2, only a modem A 200 may be connected to a SIM card 220 through four interfaces and a modem B 210 may communicate with the SIM card 220 via the modem A 200. However, the structure of FIG. 1 has a problem in that, when a mode transition occurs from a mode of using the modem A 100 to a mode of using the modem B 110, SIM related information obtained during the operation of the modem A 100 may be lost. Meanwhile, the mechanism of FIG. 2 may prevent the SIM card 220 from being reset when an operation of the modem A 200 is switched to an operation of the modem B 210, and also has a problem in that the modem A 200 has to be periodically awakened for a polling operation during the operation of the modem B 210, thereby causing additional current consumption.

SUMMARY OF THE INVENTION

An aspect of the present invention is to address at least the above-mentioned problems and/or disadvantages and to provide at least the advantages described below. Accordingly, an aspect of the present invention is to provide a method and apparatus for supporting a Subscriber Identity Module (SIM) card in a mobile communication terminal having a plurality of modems.

Another aspect of the present invention is to provide a method and apparatus for connecting a SIM card and a plurality of modems in a mobile communication terminal having a plurality of modems.

In accordance with an aspect of the present invention, an apparatus for supporting a SIM card in a mobile communication terminal having a plurality of modems is provided. The apparatus includes a SIM card for storing user information and the plurality of modems for providing a clock and for transmitting/receiving a signal by configuring an independent interface with respect to the SIM card, wherein, among the plurality of modems, only a first modem controls a reset of the SIM card.

In accordance with another aspect of the present invention, a method of supporting a SIM card in a mobile communication terminal having a plurality of modems is provided. The method includes providing a clock to a SIM card and transmitting/receiving a signal to/from the SIM card through an independent interface between a first modem and the SIM card when operating in a mode of using the first modem, delivering information generated based on the SIM card from the first modem to a second modem when operating in a mode of using the second modem, and providing a clock to the SIM card and transmitting/receiving a signal to/from the SIM card through an independent interface between the second modem and the SIM card.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary method and apparatus for connecting a plurality of modems and a Subscriber Identity Module (SIM) card in a mobile communication terminal having a plurality of modems will be described. For convenience of explanation, an exemplary case where the mobile communication terminal has two modems will be described, but the present invention may also equally apply to a case where the mobile communication terminal has three or more modems. The SIM card described herein includes all cards for storing user information. For example, the SIM card includes a Universal Subscriber Identity Module (USIM) card.

Figure 1:
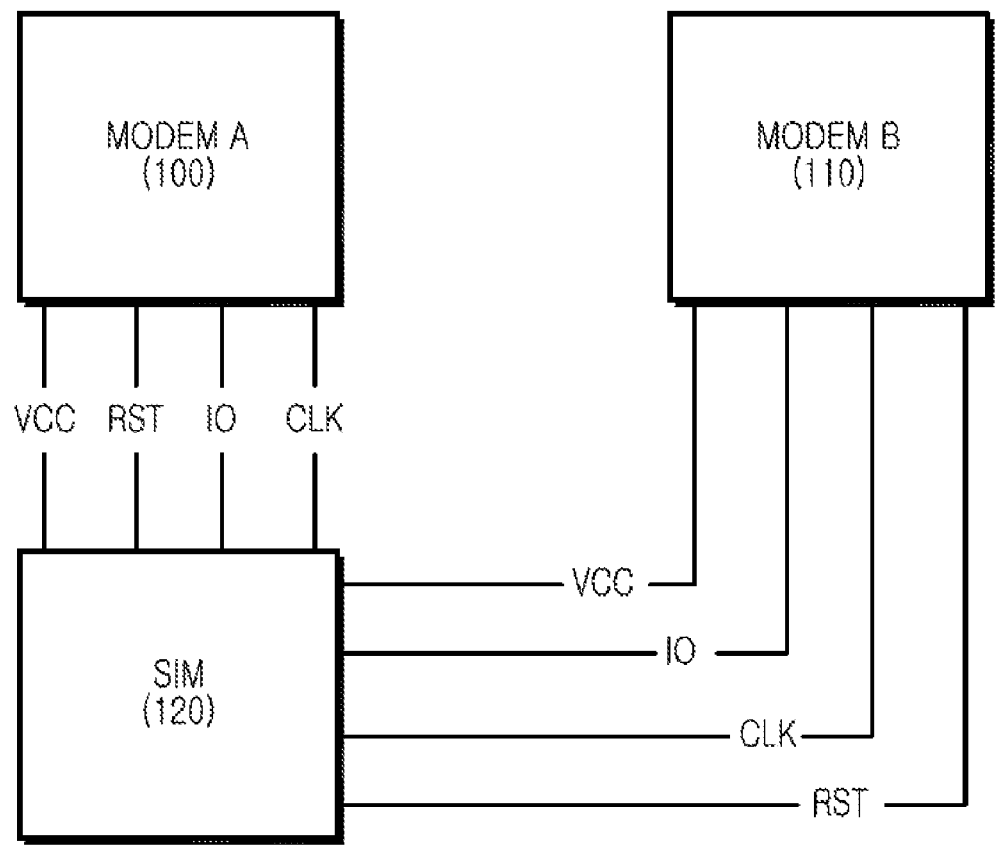
FIG. 1 and FIG. 2 illustrate a connection structure of a Subscriber Identity Module (SIM) card and a plurality of modems in a mobile communication terminal according to the related art.
Figure 2:
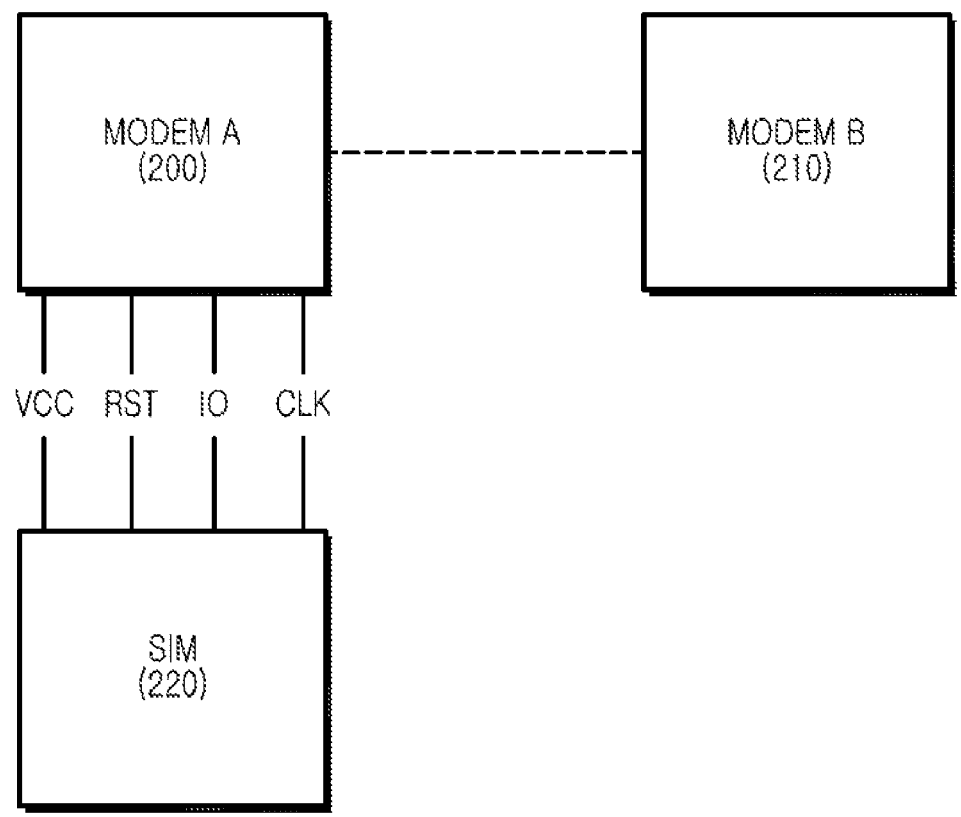
Figure 3:
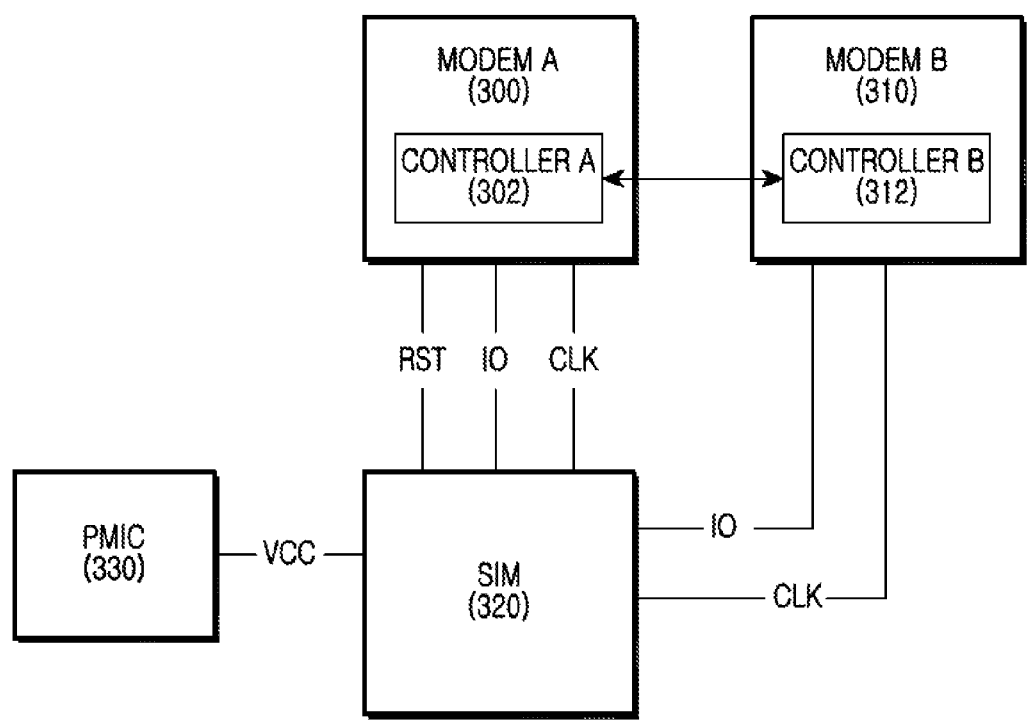
FIG. 3 illustrates a connection structure of a SIM card and a plurality of modems in a mobile communication terminal according to an exemplary embodiment of the present invention.

FIG. 3 illustrates a connection structure of a SIM card and a plurality of modems in a mobile communication terminal according to an exemplary embodiment of the present invention.

Referring to FIG. 3, the mobile communication terminal includes a modem A 300, a modem B 310, a SIM card 320, and a Power Management Integrated Circuit (PMIC) 330.

The modem A 300 modulates/demodulates a Transmit (Tx)/Receive (Rx) signal corresponding to a first communication system. According to exemplary embodiments of the present invention, the modem A 300 is connected to the SIM card 320 through a Reset (RST) line for resetting the SIM card, an Input-Output (IO) line for inputting/outputting data, and a Clock (CLK) line for providing a clock, so as to control the reset of the SIM card 320, to provide the clock to the SIM card 320, and to transmit/receive a signal to/from the SIM card 320. When the mobile communication terminal transitions from a mode of using the modem A 300 to a mode of using the modem B 310, the modem A 300 enters a sleep mode for power saving. Herein, the modem A 300 includes a controller A 302 according to an exemplary embodiment of the present invention, so as to provide information based on the SIM card 320 to the modem B 310 before entering the sleep mode when transitioning to the mode of using the modem B 310. In addition, when the reset of the SIM card 320 is requested from the modem B 310 while modem A is in the sleep mode, the modem A 300 awakens from the sleep mode and performs a function for resetting the SIM card 320, and transitions back to the sleep mode when the SIM card 320 is reset.

The modem B 310 modulates and demodulates a Tx/Rx signal corresponding to a second communication system. According to an exemplary embodiment of the present invention, the modem B 310 is connected to the SIM card 320 through an IO line for transmitting/receiving a polling signal and data and through a CLK line for providing a clock, so as to transmit/receive data to/from the SIM card 320 and to provide the clock to the SIM card. By including the controller B 312 according to an exemplary embodiment of the present invention, the modem B 310 receives SIM card related data from the modem A 300 when the mobile communication terminal transitions from the mode of using the modem A 300 to the mode of using the modem B 310. Further, when the reset of the SIM card 320 is required, the modem B 310 uses the controller B 312 to request the modem A 300 which is in the sleep mode to reset the SIM card. Herein, the reset of the SIM card 320 may, for example, be required when voltage switching is necessary before booting of the mobile communication terminal or may be required during an operation of a SIM Application ToolKit (SATK).

The SIM card 320 is attachable to and detachable from the mobile communication terminal, and has a micro processor and a memory chip to store and manage a variety of user information. When it is attached to the mobile communication terminal, the SIM card 320 is connected to each of the plurality of modems included in the mobile communication terminal through the IO line for transmitting/receiving the polling signal and the data and through the CLK line for providing the clock. More particularly, when it is attached to the mobile communication terminal, the SIM card 320 is connected to one of the plurality of modems 300 and 310 included in the mobile communication terminal, that is, the SIM card 320 is connected to, for example, the modem A 300, through the RST line for resetting the SIM card, and thus performs an operation for the reset of the SIM card 320 under the control of the modem A 300. In addition, the SIM card 320 receives power from the PMIC 330. Herein, since the SIM card 320 receives power by using the additional PMIC 330 without receiving the power from the modem, modems not corresponding to systems used in the mobile communication terminal may transition to the sleep mode.

The PMIC 330 is connected to the SIM card 320 through a Voltage (VCC) line for supplying power, and thus performs a function for supplying power to the SIM card 320.

Figure 4:
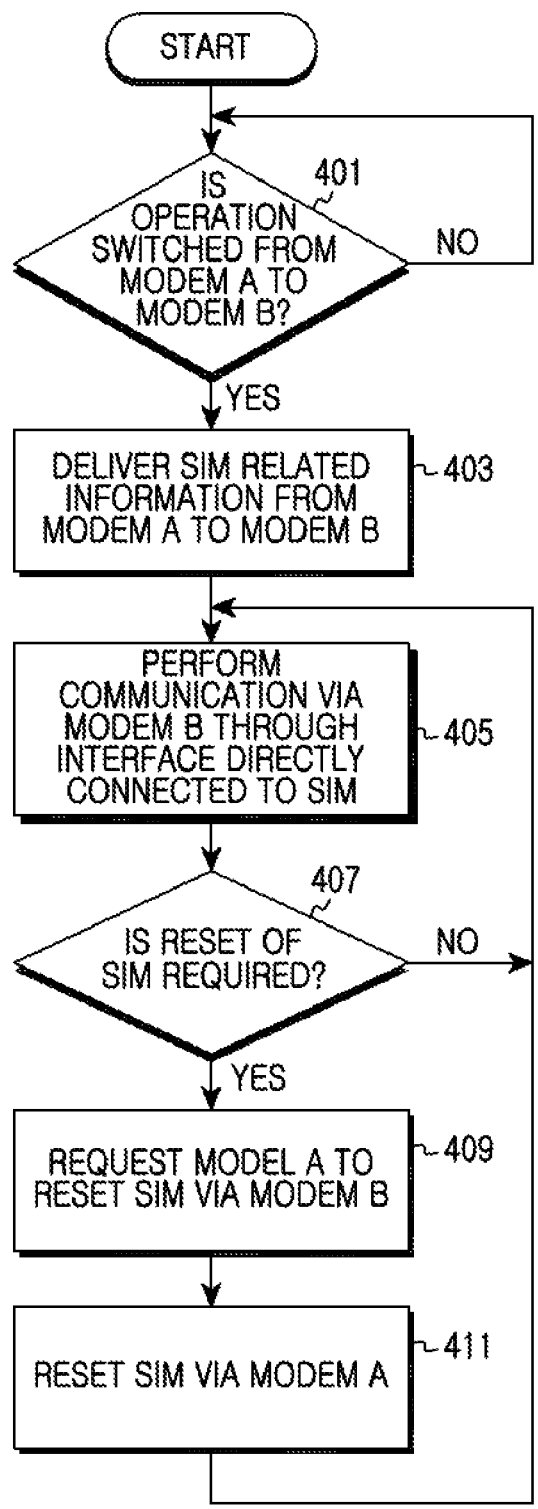
FIG. 4 is a flowchart illustrating a process of operating a mobile communication terminal according to an exemplary embodiment of the present invention.

FIG. 4 is a flowchart illustrating a process of operating a mobile communication terminal according to an exemplary embodiment of the present invention. It is assumed herein that the mobile communication terminal is under operation via the modem A 300 of FIG. 3.

Referring to FIG. 4, the mobile communication terminal determines whether an event for a mode transition from the mode of using the modem A 300 to the mode of using the modem B 310 occurs in step 401. If the event for transitioning to the mode of using the modem B 310 is determined not to occur, the mobile communication terminal performs operations for resetting the SIM card 320, for providing a clock, and for transmitting/receiving a polling signal and data, via the modem A 300.

Otherwise, if the event for transitioning to the mode of using the modem B 310 is determined to occur, proceeding to step 403, the mobile communication terminal provides SIM card related information (e.g., identity information based on the SIM card) generated during the operation of the modem A 300 to the modem B 310 by using the controller A 302 of the modem A 300. In this case, after delivering the SIM card related information, the modem A 300 transitions to the sleep mode for power saving.

In step 405, the mobile communication terminal performs operations for providing a clock to the SIM card 320 and for transmitting/receiving a polling signal and data via the modem B 310. In this case, the modem B 310 uses the IO line and the CLK line which are directly connected to the SIM card 320.

In step 407, the mobile communication terminal determines whether a reset of the SIM card 320 is required. If it is determined that the reset of the SIM card 320 is not required, returning to step 405, the subsequent steps are repeated.

Otherwise, if it is determined that the reset of the SIM card 320 is required, the mobile communication terminal via the modem B 310 requests the modem A 300 to reset the SIM card 320 in step 409, and then proceeding to step 411, the mobile communication terminal performs a function for resetting the SIM card 320 via the modem A 300. Herein, when the reset of the SIM card 320 is requested from the modem B 310, the modem A 300 awakens from the sleep mode to perform a function for resetting the SIM card 320, and transitions back to the sleep mode when the SIM card 320 is reset. Thereafter, returning to step 405, the subsequent steps are repeated.

According to exemplary embodiments of the present invention, interfaces for inputting/outputting data to/from a SIM card and for providing a clock to the SIM card are configured for each of a plurality of modems, and the SIM card and an interface for resetting the SIM card are configured only for a single modem, so that the plurality of modems transmit/receive a control signal for resetting the SIM card to/from the single modem. Therefore, the SIM card may be prevented from being reset when an operation of one modem is switched to an operation of another modem, and the modems may be maintained in a sleep state when they are not operated, thereby being able to avoid additional current consumption.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for supporting a Subscriber Identity Module (SIM) card in a mobile communication terminal comprising a plurality of modems, the apparatus comprising:
   the SIM card for storing user information; and
   the plurality of modems each for providing a clock to the SIM card and for transmitting/receiving a signal by an independent interface with respect to the SIM card,
   wherein, among the plurality of modems, only a first modem controls a reset of the SIM card.

2. The apparatus of claim 1, wherein each of the plurality of modems requests the first modem to reset the SIM card.

3. The apparatus of claim 1, further comprising a Power Management Integrated Circuit (PMIC) for supplying power to the SIM card.

4. The apparatus of claim 1, wherein, when the mobile communication terminal transitions from a mode of using the first modem to a mode of using a second modem, the first modem delivers information generated based on the SIM card to the second modem and then transitions to a sleep mode.

5. The apparatus of claim 4, wherein, when the reset of the SIM card is requested from the second modem while the first modem is operating in the sleep mode, the first modem awakens from the sleep mode to reset the SIM card, and then transitions back to the sleep mode.

6. The apparatus of claim 1, wherein the signal comprises a polling signal and data.

7. A method of supporting a Subscriber Identity Module (SIM) card in a mobile communication terminal comprising a plurality of modems, the method comprising:
   when operating in a mode of using a first modem, the first modem providing a clock to the SIM card and transmitting/receiving a signal to/from the SIM card through an independent interface between the first modem and the SIM card;
   when operating in a mode of using a second modem, delivering information generated based on the SIM card from the first modem to the second modem and the second modem providing a clock to the SIM card and transmitting/receiving a signal to/from the SIM card through an independent interface between the second modem and the SIM card,
   wherein a reset of the SIM card is controlled by only the first modem among the plurality of modems.

8. The method of claim 7, further comprising the first modem transitioning to a sleep mode after the first modem delivers the information to the second modem.

9. The method of claim 7, further comprising:
   if the reset of the SIM card is required while operating in a mode of using the second modem, requesting the first modem, by the second modem, to reset the SIM card; and
   resetting the SIM card by the first modem.

10. The method of claim 9, wherein the resetting of the SIM card comprises:
    receiving the request of the second modem by the first modem in the sleep mode;
    the first modem awakening from the sleep mode;
    resetting the SIM card by the first modem; and
    transitioning the first modem back to the sleep mode.

11. The method of claim 7, wherein the signal comprises a polling signal and data.

* * * * *